United States Patent [19]

Caines

[11] Patent Number: 4,486,483

[45] Date of Patent: Dec. 4, 1984

[54] POLYESTER FILM PRIMED WITH ORGANIC ACID SALTS

[75] Inventor: R. Scott Caines, Greer, S.C.

[73] Assignee: American Hoechst Corporation, Somerville, N.J.

[21] Appl. No.: 512,254

[22] Filed: Jul. 11, 1983

[51] Int. Cl.³ .................. B32B 27/14; B32B 27/36
[52] U.S. Cl. .................................. 428/195; 428/207; 428/341; 428/480
[58] Field of Search ............... 428/480, 483, 215, 341, 428/195; 264/134, 130, 37, 216; 430/160, 535; 303/13

[56] References Cited

U.S. PATENT DOCUMENTS

| | | | |
|---|---|---|---|
| 2,627,088 | 2/1953 | Alles et al. | 264/134 |
| 2,698,240 | 12/1954 | Alles et al. | 430/535 |
| 3,277,227 | 10/1966 | Kesseler et al. | 264/216 |
| 3,393,081 | 7/1968 | Bogle | 303/13 |
| 3,419,421 | 12/1968 | Eastes | 428/341 X |
| 3,715,421 | 2/1973 | Martin et al. | 264/130 |
| 3,819,773 | 6/1974 | Pears | 264/37 |
| 4,214,035 | 7/1980 | Heberger | 428/483 X |
| 4,225,644 | 9/1980 | Tsuchiya et al. | 428/215 |
| 4,252,885 | 2/1981 | McGrail et al. | 430/160 |

FOREIGN PATENT DOCUMENTS

| | | | |
|---|---|---|---|
| 1000019 | 8/1965 | United Kingdom | 428/480 |
| 1411564 | 10/1975 | United Kingdom | 428/480 |

Primary Examiner—Thomas J. Herbert
Attorney, Agent, or Firm—Michael J. Tully; James R. Cartiglia

[57] ABSTRACT

A prime coated oriented polyester film is disclosed wherein the primer coating is applied as an aqueous medium consisting essentially of a material selected from the group consisting of a water soluble alkali metal salt of an unsaturated fatty acid having from about 10 to 18 carbon atoms and mixtures of such salts or a water soluble alkali metal salt of an alkyl sulfate having from about 8 to 18 carbon atoms and mixtures of such salts. Preferred species include sodium oleate and sodium lauryl sulfate. The alkali metal salt priming layer may be applied to the polyester film at any suitable stage during manufacture of the film, i.e., before or during the stretching operations, or after stretching and prior to winding of the film. The resultant primed polyester film is found to provide excellent adhesion to many aqueous or organic solvent based printing inks subsequently applied thereto.

17 Claims, No Drawings

POLYESTER FILM PRIMED WITH ORGANIC ACID SALTS

The present invention relates to oriented polyester film coated on one or both sides with a water soluble alkali metal salt of an unsaturated fatty acid having from about 10 to 18 molecular carbon atoms, or a water soluble alkali metal salt of an alkyl sulfate having from about 8 to 18 molecular carbon atoms.

BACKGROUND OF THE INVENTION

Oriented polyester film, particularly biaxially oriented film composed of polyethylene terephthalate (PET) is widely used as a packaging and label material for a variety of products, including foodstuffs.

Because the surface of oriented PET film is hydrophobic, it is not readily receptive to coating or printing. In many packaging and label applications it is advantageous that the film be receptive to ordinary flexographic and rotogravure printing inks.

In an attempt to remedy this deficiency, special inks have been devised that adhere directly to the surface of PET film. However, many such inks are based on formulations of organic solvents, resinous binders and other ingredients which are costly, difficult to handle and hazardous for use in the manufacturing plant.

Another approach for improving the printability of PET film is to apply a primer coating which adheres to the film and is receptive as well to printing inks applied thereto. Examples of such primer coatings include polymeric compositions based on vinylidene chloride terpolymers such as disclosed in U.S. Pat. No. 2,698,240 or water dispersible copolyester primers such as disclosed in U.S. Pat. No. 4,252,885. The problem with this approach to enhancing ink adhesion to PET film is that the film is in many instances used as a food packaging material and consequently the relative toxicity of the primer layer becomes important. Though polyester film per se is approved as a food packaging material by most Governmental agencies, including the U.S. Food and Drug Administration, polyester film primed with certain polymeric primer coatings such as acrylics, vinylidene chloride-containing polymers and many other similar primers raised toxicity problems because of potential migration of said primer material into foodstuffs with which it is in contact.

It is known to include small quantities of sodium alkyl sulfates into aqueous dispersions of resinous materials which dispersions are employed as a primer layer for biaxially oriented PET film. The sulfates serve as emulsifiers or wetting agents in such applications, such as taught in U.S. Pat. No. 2,627,088. It is known to utilize various organic or inorganic salts as slip agents in the production of polyolefin films such as disclosed in U.S. Pat. No. 3,277,227, and it is also known to coat polypropylene film with certain fatty acid amides to impart anti-blocking and lubricity characteristics as taught in U.S. Pat. No. 4,255,644. British Pat. No. 1,000,019 teaches a method for improving the slip properties of biaxially oriented PET film by coating the film with an aqueous solution comprising sodium silicate, amorphous silica and a surface active agent. U.S. Pat. No. 3,715,421 suggests the use of certain fatty acid salts as lubricating finishes for polyester filaments. U.S. Pat. No. 3,393,081 teaches the application of a thin film of a saturated fatty acid and/or a fatty alcohol to biaxially oriented polystyrene sheet material in order to impart the property of heat sealability to the film.

None of these prior art disclosures, however, are addressed to the problem of the enhancement of the printability of polyester film and the solution of that problem by the technique hereinafter disclosed.

Accordingly it is an object of this invention to provide an oriented, self-supporting polyester film material having enhanced receptivity to flexographic or rotogravure printing inks.

Another object is to provide a primer coating for oriented polyester film material which can safely and easily be applied in the plant during production of the film.

A further object is to provide a primer material for biaxially oriented polyethylene terephthalate film material which renders such film generally receptive to flexographic or rotogravure printing inks for packaging applications.

SUMMARY OF THE INVENTION

These and other objects of the invention may be achieved by the provision of a prime coated oriented polyester film wherein the primer coating is applied as an aqueous medium consisting essentially of a material selected from the group consisting of a water soluble alkali metal salt of an unsaturated fatty acid having from about 10 to 18 carbon atoms and mixtures of such salts or a water soluble alkali metal salt of an alkyl sulfate having from about 8 to 18 carbon atoms and mixtures of such salts.

The alkali metal salt priming layer may be applied to the polyester film at any suitable stage during manufacture of the film, i.e., before or during the stretching operations, or after stretching and prior to winding the film. The resultant primed polyester film is found to provide excellent adhesion to many aqueous or organic solvent based printing inks subsequently applied thereto.

DETAILED DESCRIPTION OF THE INVENTION

The preferred oriented polyester film base for the purposes of this invention is made from polyethylene terephthalate, although the invention is equally applicable to film based on a crystallizable polyester resulting from the polycondensation of a glycol such as ethylene glycol or butane diol and mixtures thereof with terephthalic acid or mixtures of terephthalic acid and other dicarboxylic acids such as isophthalic acid, diphenic acid and sebacic acid, or their polyester forming equivalents, which polyesters are made by methods well known in the art. The film may be produced by techniques also well known in the art using well known apparatus.

For example, the polyester is melted and extruded as an amorphous sheet onto a polished revolving casting drum to form a cast sheet of the polymer. Thereafter, the film is axially stretched in one direction, either in the direction of extrusion (longitudinal), or perpendicular to the direction of extrusion (transverse) in the case of monoaxially oriented film, and in two directions in the case of biaxially oriented film, that is, the film is stretched in both the longitudinal and transverse directions. The first stretching step of the cast sheet may be in either of these two orthogonal directions. The amount of stretching, to impart strength and toughness to the film, can range from about 3.0 to about 5.0 times the original cast sheet dimension in one or both directions. Preferably, the amount of stretching is in the range of between about 3.2 and 4.2 times the original dimension. The stretching operations are carried out at temperatures in the range of from about the second order transition temperature to below the temperature at which the polymer softens and melts.

Where desired, the film is heat treated, after stretching, for a period of time necessary to crystallize the polyester film. Crystallization imparts stability and good tensile properties to the film. When polyethylene terephthalate is heat treated, it is subjected to a temperature in the range of between about 190° C. and 240° C. and, more preferably, in the range from about 215° C. and 235° C.

The alkali metal salt primer coating of this invention in the form of an aqueous solution may be applied in-line at one of three stages during the film manufacture: the pre-draw stage at the point between the casting of the amorphous sheet and the first stretch such as disclosed, for example, in British Pat. No. 1,411,564; the inter-draw stage subsequent to the uniaxial drawing but prior to biaxial such as disclosed, for example, in the U.S. Pat. No. 4,214,035; or the post draw stage subsequent to biaxial stretching, but prior to winding the film. Normally, the heat applied to the film during the stretching or final conditioning stages is sufficient to evaporate off the water and other volatiles and dry the primer coating, although a separate drying step would be required if the coating were applied subsequent to such heating steps.

In one preferred embodiment, the primer coating is applied after the film is uniaxially stretched, that is, after the film is stretched in one direction, but before the film is stretched in the orthogonal direction. In another preferred embodiment, the polyester film is first stretched in the longitudinal direction prior to coating. In this preferred embodiment, after longitudinal stretching, the film is coated by any of the well known techniques employed in the art. For example, coating may be effected by roller coating, spray coating, slot coating or immersion coating. In a preferred embodiment, the polyester film is coated by means of gravure roller coating. Also, the uniaxially drawn film may be subjected to a corona discharge by a corona discharge apparatus prior to coating as is known in the art. The discharge treatment decreases the hydrophobic character of the polyester film surface, which permits the water based coating to more easily wet the surface and thus improve the adhesion of the coating to the surface.

As indicated above water soluble alkali metal salts of unsaturated fatty acids having from about 10 to 18 carbon atoms are effective as ink adhesion promoting primer layers for PET film. More preferred are sodium or potassium oleate. Also included in this class are the sodium or potassium salts of palmitoleic, ricinoleic and petroselinic acids.

Also effective in enhancing ink adhesion are the water soluble alkali metal salts of alkyl sulfates having from about 8 to 18 carbon atoms. Included in this class are sodium or potassium tetradecyl sulfate, sodium or potassium lauryl sulfate, sodium or potassium octyl sulfate and sodium or potassium myristyl sulfate.

By the term water soluble is meant that the salts should be soluble in ordinary tap water at room temperature at concentrations of at least 0.4 g. per 100 cc water, more preferably at concentration in excess of 2.0 g. per 100 cc of water.

The salts used as PET primer coatings must also exhibit relative heat stability at temperatures in excess of 200° C. which are encountered during the drying and heat setting of oriented polyester film. Because of high heat stability, good water solubility and commercial availability, sodium oleate (sodium salt of cis-9-octadecenoic acid) and sodium lauryl sulfate are the preferred species of water soluble salts for the purposes of this invention.

As indicated above, the primer coating of the present invention is applied to the base polyester film as an aqueous solution and at a solids concentration within the range of about 0.2 to 15% by weight preferably about 0.3 to 6% by weight. The preferred solids level is such as to yield a final dry coating weight of about $1 \times 10^{-8}$ to $2 \times 10^{-5}$ lbs. per square foot of film surface. Preferably the range is from about $2 \times 10^{-7}$ to $7 \times 10^{-6}$ lbs per square foot, with $8 \times 10^{-7}$ lbs per square foot being the target weight.

The coating of this invention may be applied to one or both sides of the film, or it may be applied to one side and a different coating such as a thermosetting acrylic or methacrylic applied to the opposite side, such as taught in U.S. Pat. No. 4,214,035. The coating may also in some cases be applied over a different primer coating to which it will adhere and which is already present on the surface of the film, such as a thermosetting acrylic coating as described in U.S. Pat. No. 3,819,773.

The aqueous solution consists essentially of the above defined acid salt and does not include other ingredients which would detract from the adhesion promoting characteristics thereof, such as particulate material, or polymeric ingredients in which the salt might be present in minor amounts as an emulsifier or dispersing agent. The term consisting essentially of is not intended however to exclude the presence of minor amounts of other water soluble ingredients such as water soluble dyes, pH regulating agents, and the like. Preferably the aqueous solution consists of water (de-ionized or tap) and from about greater than 0.2% to about 10% by weight of one or more of the above defined acid salts. The primer coating is present on the surface of the film as a continuous coating, which term is intended also to include cases where the primer may form a plurality of segregated regions or islands of coating. In either case substantial improvement in ink adhesion is obtained.

The primer coatings of the invention exhibit excellent heat stability and accordingly any scrap primed film made during production can be mixed with fresh polyester, re-melted and re-fed to the film-forming extruder to produce oriented film. Such film produced containing significant quantities of primed scrap reclaim exhibits good quality, color and appearance with very little perceptible degradation of properties due to the presence of the coating impurity. Thus the primed film of this invention offers commercial advantage to the film manufacturer over many other primed films, such as films primed with vinylidene chloride containing polymers as disclosed in U.S. Pat. Nos. 2,627,088 and 2,698,240, which tend to degrade and discolor when reclaimed as set forth above.

A major application of the primed film of this invention is as a packaging or label material. The primed films demonstrate improved adhesion to aqueous and organic solvent based flexographic and rotogravure printing inks when compared with unprimed film. These inks may comprise aqueous/alcohol or organic solvent dispersions or solutions of dyes optionally in combination with soluble resins and thickening agents.

The following examples are illustrative of the invention.

EXAMPLE I

Polyethylene terephthalate polymer was melted and extruded through a slot die onto casting drum maintained at a temperature of about 20° C. The melt froze to form a cast sheet. The cast sheet was longitudinally stretched at a draw ratio of approximately 3.5:1 while maintained at a temperature of about 80° C.

The longitudinally drawn film was corona treated by corona discharge apparatus and thereinafter coated with an aqueous solution containing 4% by weight of dissolved sodium lauryl sulfate by reverse gravure coating.

The corona treated, longitudinally drawn, coated film was dried at a temperature of about 100° C. Thereafter, the film was stretched in the transverse direction at a draw ratio of 3.9:1 to produce a biaxially drawn film. The biaxially drawn film was heat set at a maximum temperature of 230° C. The dry weight of the coating was about $6.77 \times 10^{-6}$ lbs per square foot of film. The thickness of the base PET film was about 0.48 mil.

EXAMPLE II

Example I was repeated exactly as set forth above except the coating composition consisted of an aqueous solution containing 4% by weight of dissolved sodium oleate. The dry weight of the coating was about $7.31 \times 10^{-6}$ lbs per square foot of film.

EXAMPLE III

Example II was repeated exactly as set forth above except that the coating composition consisted of an aqueous solution containing 0.46% by weight of dissolved sodium oleate. The dry weight of the coating was about $0.83 \times 10^{-6}$ lbs per square foot of film.

Each of the primed films of Examples 1-3 were evaluated for ink adhesion using five different aqueous or solvent based commercially available inks. The tests were conducted by applying the inks to cut pieces of the film samples by a draw down technique using a No. 6 Meyer rod, followed by oven drying of the ink at 140° F. for at least one minute. A strip of adhesive tape (Scotch brand No. 610) was adhered to the dried inked surface, rubbed with the finger to insure intimate contact, and then rapidly pulled away from the film. The amount of ink remaining in the area which was under the tape is then expressed as a percentage of the area, i.e., no ink removed equals 100% adhesion; all ink removed equals 0% adhesion, with intermediate adhesion values being assessed in terms of the proportion of ink remaining adhered to the film.

The five commercial inks evaluated were (A) Inmont Aquabond "S" white from the Inmont Corp. of Charlotte, N.C.; (B) Bemis Water Laminating FS Yellow; (C) Bemis Solvent Opaque White, both available from the Bemis Corp. of Indianapolis, Ind.; (D) AMS #245 Solvent Black from the Patterson Stamp Works Division of American Marking Systems in Clifton, N.J.; and (E) CPI R-1094 Water Red from Custom Printing Inks, Ltd. of San Diego, Cal.

Results of the adhesion tests vs a control unprimed PET film are as follows:

TABLE

| INK | CONTROL | EX I | EX II | EX III |
|---|---|---|---|---|
| A | 13% | 95% | 97% | 99% |
| B | 20% | 80% | 25% | 25% |
| C | 30% | 20% | 73% | 90% |
| D | 3% | 30% | 100% | 100% |
| E | 10% | 70% | 60% | 40% |

As can be seen from the Table above, film primed with the sodium lauryl sulfate exhibited enhanced adhesion with respect to aqueous based inks whereas film primed with sodium oleate showed generally better adhesion with respect to inks based on organic solvents.

What I claim is:

1. An oriented self-supporting polyester film having a thin continuous primer coating on one or both sides thereof, said coating consisting essentially of a salt selected from the group consisting of:
   (a) a water soluble alkali metal salt of an unsaturated fatty acid having from 10 to 18 carbon atoms and mixtures of such salts; or
   (b) a water soluble alkali metal salt of an alkyl sulfate having 8 to 18 carbon atoms, and mixtures of said salts,
said primer coating being present at a weight effective to improve the adhesion of printing inks to said film.

2. The film of claim I wherein said oriented polyester film is biaxially oriented polyethylene terephthalate film.

3. The film of claim 2 having a printing ink composition applied directly to said primer coating.

4. The film of claim 1 wherein said film is prepared by melt extruding a substantially amorphous polyester film and thereafter orienting the film by stretching in one or two directions and heat setting the film, said primer coating being applied to said film as an aqueous solution prior to stretching in one direction, or subsequent to stretching in one direction but prior to stretching in a mutually perpendicular direction, or subsequent to stretching but prior to winding the oriented film.

5. The film of claim 4 wherein said film is subjected to a corona discharge treatment prior to the application of said primer coating.

6. The film of claim 4 wherein said primer coating is applied subsequent to stretching in one direction but prior to stretching in a mutually perpendicular direction.

7. The film of claim 6 wherein said oriented polyester film is biaxially oriented polyethylene terephthalate film.

8. The film of claim 7 wherein said primer coating is present at a weight within the range of about $1 \times 10^{-8}$ to $2 \times 10^{-5}$ lbs. per square foot of film surface on a dry weight basis.

9. The film of claim 8 wherein said primer coating comprises a water soluble alkali metal salt of an unsaturated fatty acid having from 10 to 18 carbon atoms.

10. The film of claim 9 wherein said primer coating comprises an alkali metal salt of oleic acid.

11. The film of claim 10 wherein said primer coating comprises sodium oleate.

12. The film of claim 11 having a printing ink composition applied directly to said primer coating.

13. The film of claim 11 wherein said primer coating is present at a dry weight within the range of about $2 \times 10^{-7}$ to $7 \times 10^{-6}$ lbs per square foot of film surface.

14. The film of claim 8 wherein said primer coating comprises a water soluble alkali metal salt of an alkyl sulfate having from 8 to 18 carbon atoms.

15. The film of claim 14 wherein said primer coating comprises sodium lauryl sulfate.

16. The film of claim 15 wherein said primer coating is present at a dry weight within the range of about $2 \times 10^{-7}$ to $7 \times 10^{-6}$ lbs per square foot of film surface.

17. The film of claim 15 having a printing ink composition applied directly to said primer coating.

* * * * *